United States Patent
Grolleau

(10) Patent No.: US 10,214,262 B2
(45) Date of Patent: Feb. 26, 2019

(54) COLLAPSIBLE KICK-SCOOTER VEHICLE

(71) Applicant: MICRO MOBILITY SYSTEMS AG, Kuesnacht (CH)

(72) Inventor: Franck Grolleau, Luce (FR)

(73) Assignee: MICRO MOBILITY SYSTEMS AG, Kuesnacht (CH)

( * ) Notice: Subject to any disclaimer, the term of this patent is extended or adjusted under 35 U.S.C. 154(b) by 0 days.

(21) Appl. No.: 15/626,755

(22) Filed: Jun. 19, 2017

(65) Prior Publication Data

US 2017/0320534 A1    Nov. 9, 2017

Related U.S. Application Data

(63) Continuation of application No. PCT/FR2015/053509, filed on Dec. 15, 2015.

(51) Int. Cl.
*B62K 15/00* (2006.01)
*B62K 3/00* (2006.01)

(52) U.S. Cl.
CPC ............ *B62K 15/006* (2013.01); *B62K 3/002* (2013.01)

(58) Field of Classification Search
None
See application file for complete search history.

(56) References Cited

U.S. PATENT DOCUMENTS 3,998,476 A * 12/1976 Kazmark, Sr. .......... B62B 1/125
280/655

FOREIGN PATENT DOCUMENTS

DE    29902314 U1    6/1999
EP    2 174 860 A1   4/2010
(Continued)

OTHER PUBLICATIONS

Aug. 31, 2015 French Search Report, which is enclosed without an English Translation, that issued in French Patent Application No. 1402934.

(Continued)

*Primary Examiner* — Paul N Dickson
*Assistant Examiner* — Hilary L Johns
(74) *Attorney, Agent, or Firm* — Cowan, Liebowitz & Latman, P.C.; Mark Montague

(57) ABSTRACT

The invention is based on a wheeled kick-scooter vehicle, comprising: a platform of elongate shape, which is at its rear end provided with a wheel, and which a user may rest at least one foot upon; a steering rod capable of pivoting about a first axis, which is transversal with respect to the forward-motion direction of the vehicle, wherein the rod comprises a first distal end which is provided with a steering device, e.g. a handlebar or a knob, and comprises a second proximal end which is connected to a front wheel via the intermediary of at least one fork straddling the front wheel; wherein the platform is mounted in such a way that it pivots with respect to a second axis that is transversal to the first axis, the platform being thus movable between two extreme positions, namely an active rolling position, in which it is substantially perpendicular to the rod, and a folded-up position in parallel to the rod and close to the latter; wherein the vehicle further comprises a compression mechanism, e.g. a spring, which has an elongate shape and a first end of which is connected to said platform at a distance unequal to zero from the second axis, and a second end of which is connected to said rod for the purpose of exerting a lifting force onto the platform, inducing a torque about the second pivot axis of the platform. It is proposed that the platform is connected to the rod via a bracket which is shaped like an inverted U and spans the fork while permitting the rotation (Continued)

of the latter, wherein the U-shaped bracket features two spaced-apart parallel arms and the second pivot axis is arranged at the free ends of the parallel arms of the bracket.

10 Claims, 4 Drawing Sheets

(56) References Cited

FOREIGN PATENT DOCUMENTS

| WO | 02/46032 A1 | 6/2002 | | |
|---|---|---|---|---|
| WO | 2004/093595 A1 | 11/2004 | | |
| WO | WO-2004093595 A1 * | 11/2004 | ............... | A45C 5/14 |

OTHER PUBLICATIONS

Mar. 30, 2016 International Search Report, which is enclosed that issued in International Application No. PCT/FR2015/053509.

* cited by examiner

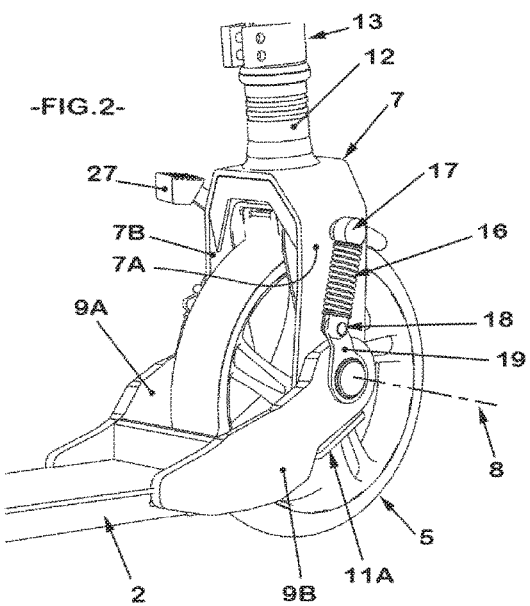
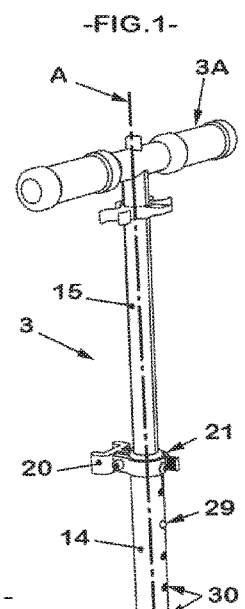
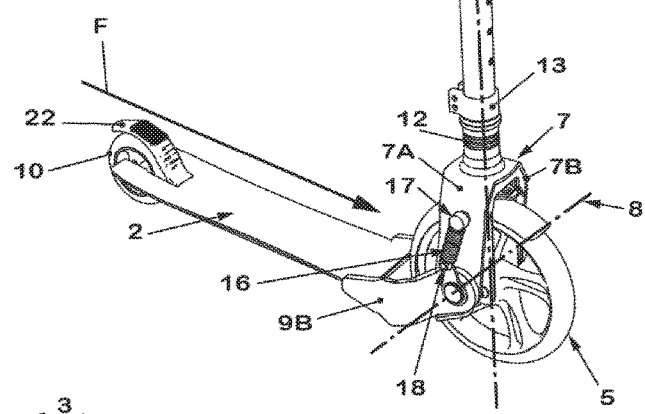
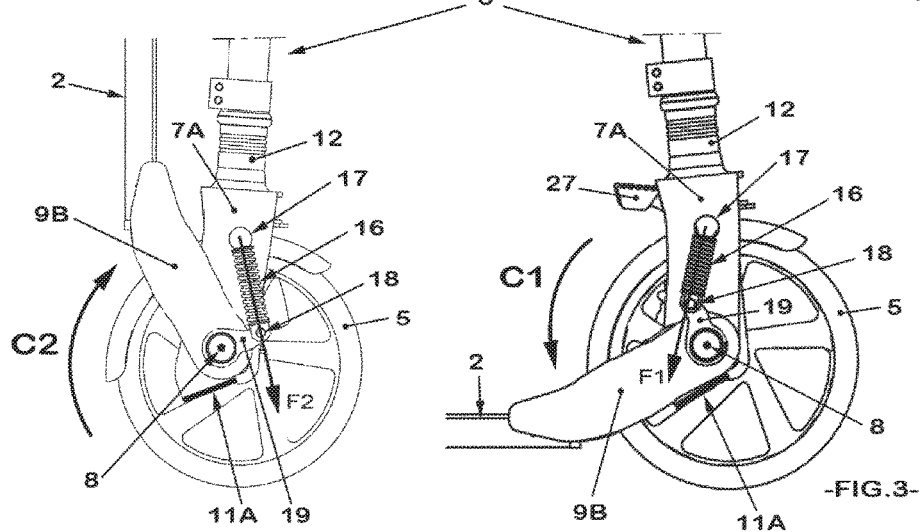

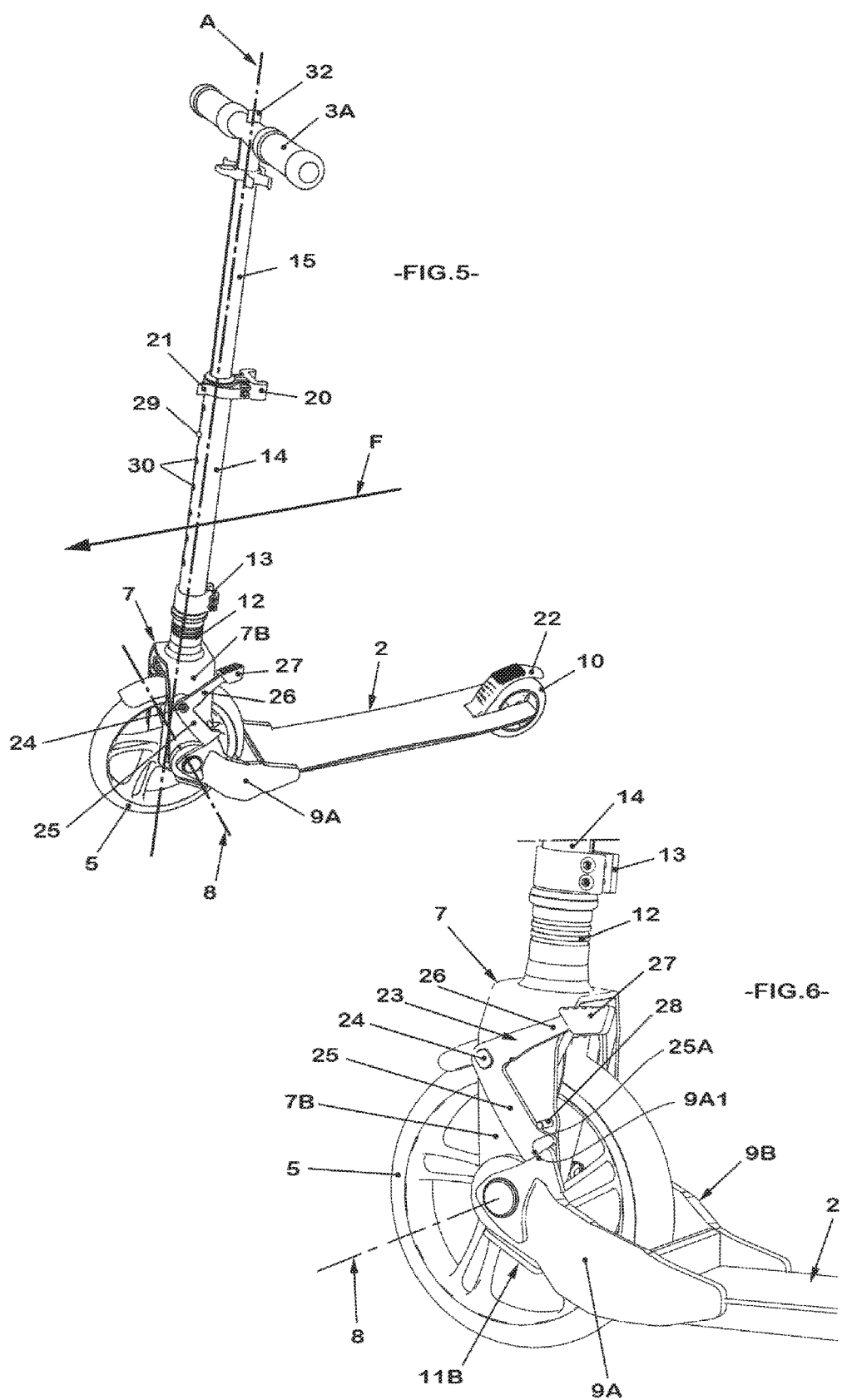

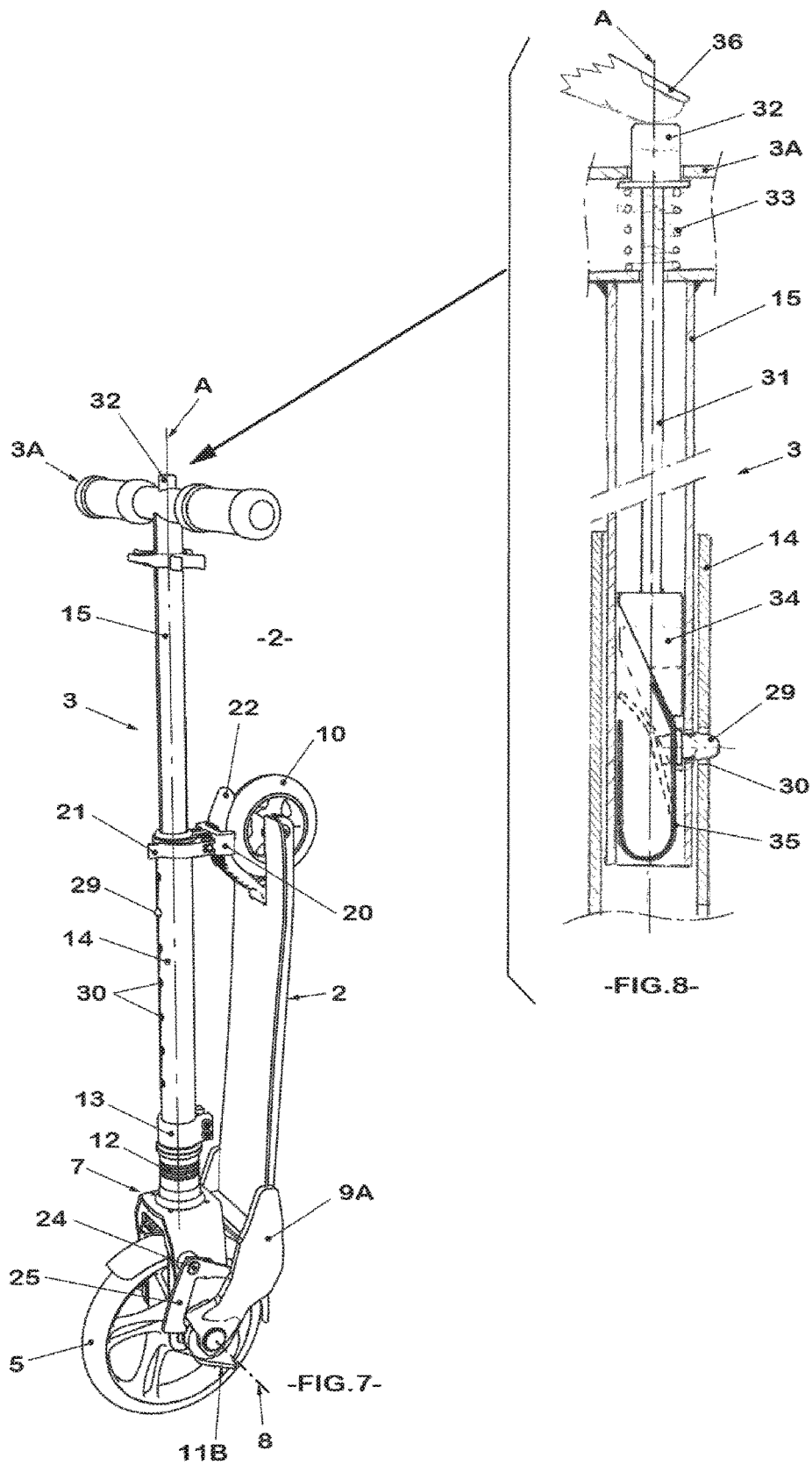

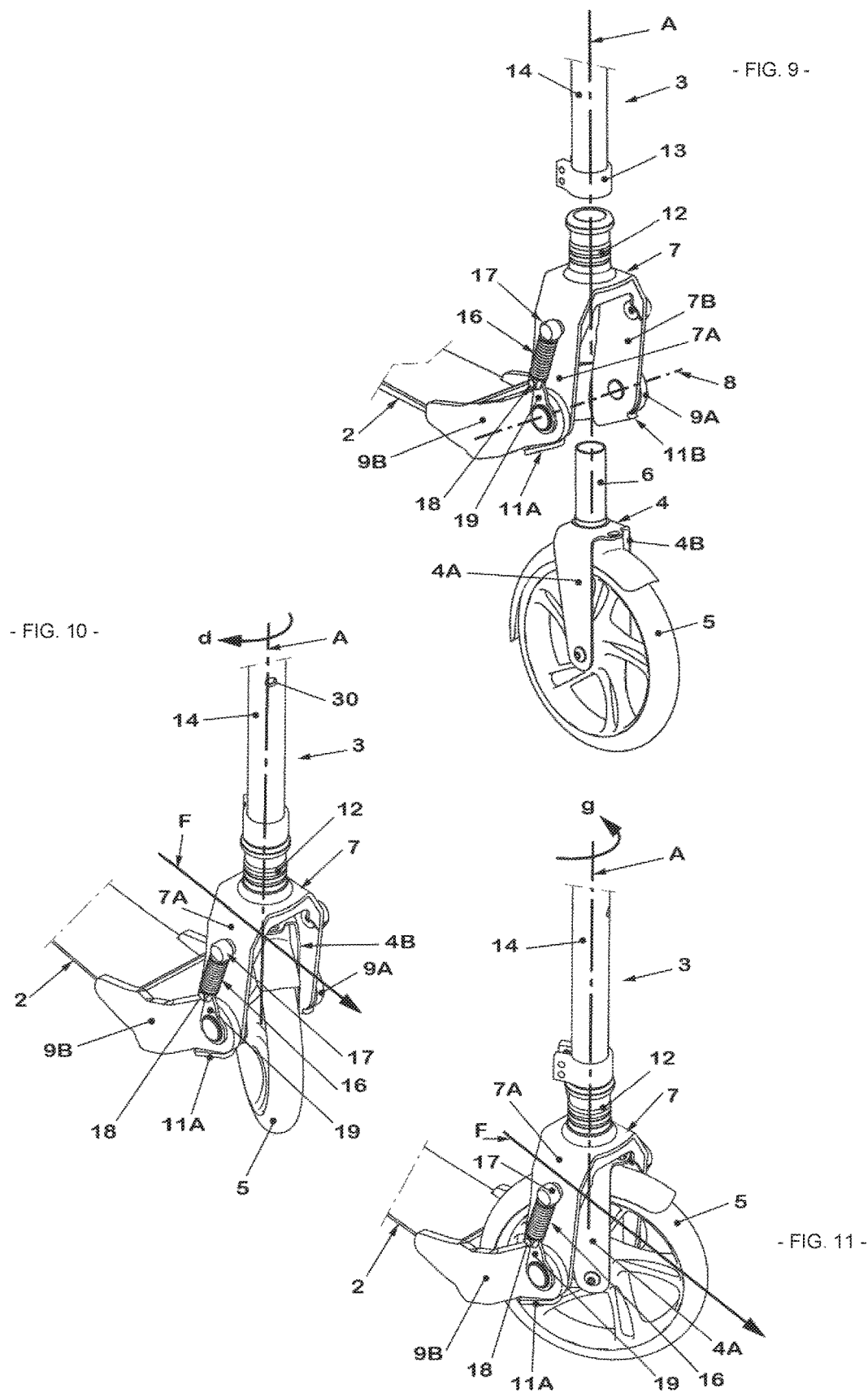

COLLAPSIBLE KICK-SCOOTER VEHICLE

FIELD OF THE INVENTION

The invention relates to the field of wheeled kick-scooter vehicles, allowing transport of a person by means of a platform which is sufficiently large to allow a user positioning at least one foot on it. Wheeled vehicles of this kind also comprise a steering member, e.g. a steering rod, which is positioned substantially in front of and perpendicularly to the platform for the purpose of allowing a user to guide and stabilize the vehicle.

More particularly, the invention is directed to a wheeled vehicle in which the platform supporting the user is pivotable with respect to a steering rod. A steering rod of this kind, which is provided with steering means, e.g. a handlebar or a knob, per se allows rotationally guiding a fork with which at least one front wheel cooperates.

Generally wheeled vehicles of this kind comprise at least one wheel arranged below the steering rod and situated to the front of the platform in the preferred direction of a forward-motion of the vehicle, and they likewise comprise at least one wheel arranged at a level of a rear end of the platform.

In a known manner, said steering rod may be composed of tubes which are arranged in such a way that they are coaxial and slidable with respect to each other and lockable, or may be composed of a fix tube.

Furthermore, such wheeled vehicles are usually articulated between the steering rod and the platform in such a way that the vehicle is collapsible, thus facilitating its transport or stowage. Actually, a space requirement of the vehicle is considerably reduced due to positioning the platform substantially in parallel to the steering rod and substantially against the latter. In a known manner, the articulation between the platform and the steering rod is positioned in a region which is situated outside of the region delimited by the diameter of the front wheel and preferably behind the steering rod in the preferred direction of a forward-motion of the vehicle.

However, such a positioning of the articulation between the platform and the steering rod, on the one hand, encumbers the front wheel when the vehicle is folded up, thus often not allowing to make the vehicle roll on the front wheel trolley-fashion and, on the other hand, does not allow achieving optimum compactness of the vehicle in a folded-up position.

Furthermore, the user would like to achieve folding and unfolding of the steering rod on the platform practically automatically, without having to bend down.

By the application WO 2004/093595, a suitcase is known onto a wall of which a structure is fixated which is of a collapsible kick-scooter type and comprises a sleeve. At the upper end of the sleeve a knob is provided and on the lower end are mounted, in an articulated manner, on the one hand, a wheel and, on the other hand, a block, along the respective horizontal axes and in parallel to the ground. On said block a kick-scooter platform is mounted in such a way that it is rotatable with respect to a vertical axis, for the purpose of receiving the user's foot. A piston is mounted on the block at its lower end in an articulated manner, while its upper end is arranged inside said sleeve.

However, this known system is, on the one hand, directed at a suitcase that is connected to a kick-scooter structure and, on the other hand, does not allow having a front drive wheel which is pivotable substantially coaxially with the steering rod, as a result of which a rather considerable space requirement remains.

A first objective of the invention is to propose a mechanism allowing the user to fold the vehicle quickly, without effort and without having to bend down. A second objective is to propose a specific positioning of the articulation between the platform and the steering rod for the purpose of ensuring optimum space requirement regarding a width as well as a height of the vehicle in a folded-up position, while permitting sufficient disengagement of the front wheel for allowing the vehicle to be rolled on the front wheel in the folded position. A third objective is to propose a kick-scooter capable of being unfolded and folded up practically without effort, arranging a front drive wheel in such a way that it rotates substantially coaxially with the steering rod and still has a simple design. These advantages may be appreciated when using a wheeled vehicle of this kind in an urban environment, in particular for making use of public transports.

For this purpose, according to the invention, the collapsible wheeled kick-scooter vehicle comprises:

a platform of elongate shape, which is at its rear end provided with a wheel, and which a user may rest at least one foot upon;
 a steering rod capable of pivoting about a first axis, which is transversal with respect to the forward-motion direction of the vehicle, wherein the rod comprises a first distal end which is provided with a steering device, e.g. a handlebar or a knob, and comprises a second proximal end which is connected to a front wheel via the intermediary of at least one fork straddling the front wheel;

wherein the platform is mounted in such a way that it pivots with respect to a second axis that is transversal to the first axis, the platform being thus movable between two extreme positions, namely an active rolling position, in which it is substantially perpendicular to the rod, and a folded-up position in parallel to the rod and close to the latter;

wherein the vehicle further comprises a compression mechanism, e.g. a spring, which has an elongate shape and a first end of which is connected to said platform at a distance unequal to zero from the second axis, and a second end of which is connected to said rod for the purpose of exerting a lifting force onto the platform, inducing a torque about the second pivot axis of the platform;

the collapsible wheeled kick-scooter vehicle being characterized in that the platform is connected to the rod via a bracket which is shaped like an inverted U and spans the fork while permitting the rotation of the latter, wherein the U-shaped bracket features two spaced-apart parallel arms and the second pivot axis is arranged at the free ends of the parallel arms of the bracket.

The inverted-U-shaped bracket allows positioning the second rotational axis inside the region that is delimited by the surface of the front wheel without hampering the substantially coaxial pivoting of the front wheel with the steering rod.

The second rotational axis being situated inside a region delimited by the surface of the front wheel allows, when the vehicle is in the folded-up position, on the one hand reducing its space requirements and on the other hand disengaging the front wheel for the purpose of making the vehicle roll in trolley fashion.

Still without hampering the unfolding of the front wheel, the inverted-U-shaped bracket is also configured for supporting the fixation to the compression mechanism and to the locking lever.

Advantageously the compression mechanism is fixated on the bracket via its second end.

The compression mechanism is fixated on the platform via its first end in such a way that it exerts a lifting force on the latter in its two extreme positions.

For the purpose of reducing the dimensions of the folded-up vehicle, the second rotational axis is situated inside a region that is delimited by the surface of the front wheel.

The fixation points of the compression mechanism, respectively on the bracket and on the platform, are situated inside a region that is delimited by the surface of the front wheel.

An abutment is provided which is connected to the bracket, preventing, in one direction, the rotation of the latter, and hence of the rod, about the first rotational axis.

For the purpose of limiting the opening of the steering rod with respect to the platform, protruding abutments are provided on the bracket for abutting on the platform, thus stopping the frontward rotation of the steering rod about the second axis, with respect to a preferred direction of a forward motion of the vehicle.

The lower abutments 11A and 11B, together with the lever, allow a blockage of the rod in both directions.

For the purpose of securing the usage position (rolling), the vehicle comprises members for locking a rearward rotation of the steering rod about the second axis, in a preferred direction of a forward motion of the vehicle. These locking members advantageously comprise a lever which is articulated on the bracket between a first blockage position, in which it prevents the reciprocal rotation of the platform about the second rotational axis with respect to the rod, and a second position, in which it permits the rotation of the platform.

The lever is actuable by a foot, or by any other means that allows its tilting, to pass from the blockage position to the unblocked position (permitting the reciprocal rotation of the rod and of the platform.

The platform is connected to the second rotational axis via two opposing parallel legs arranged on both sides of the front wheel and of the arms of the bracket, and featuring a force-fit connection in pivoting about the second axis, wherein the locking members, which are fixated on the bracket, cooperate with at least one of the legs by contacting in the blockage position which corresponds to the usage position.

The steering rod comprises two coaxial tubes, the one gliding in the other one, as well as a cam which is actuatable by a push button and controls a sinking of a pin between the coaxial tubes, which unlocks the two coaxial tubes.

Advantageously a damping abutment is configured on the steering rod, which has a geometry allowing to receive the rear wheel.

For the purpose of limiting the opening of the steering rod with respect to the platform, a projection is positioned on the fork support for the purpose of abutting on the platform, thus stopping a forward rotation of the steering rod in a preferred forward direction of the vehicle.

According to another version, the platform features an asymmetrical structure and has a single arm articulated on the bracket.

BRIEF DESCRIPTION OF THE DRAWINGS

The invention will become well apparent in the light of the following description of an exemplary embodiment (wherein the invention is given as an example and is by no means limited to said embodiment), which is based on the attached drawings, of which:

FIG. 1 is a perspective view of a vehicle according to the invention, in a usage position;

FIG. 2 is a detailed perspective view of the lower front portion of the vehicle of FIG. 1;

FIGS. 3 and 4 are detailed lateral views, in an unfolded, respectively in a folded-up position of the platform;

FIG. 5 is a perspective view of the vehicle of FIG. 1, similar to FIG. 2, shown from the other side;

FIG. 6 is a detailed perspective view, similar to FIG. 2, viewed from the other side;

FIG. 7 is a perspective view of the vehicle in a folded-up position of the platform;

FIG. 8 is a partial sectional view of the steering rod;

FIG. 9 is an exploded partial perspective sectional view of the lower front portion of the vehicle;

FIGS. 10 and 11 are partial views showing the kick-scooter in perspective, wherein the front wheel is turned to the right and to the left, respectively.

DETAILED DESCRIPTION OF INVENTION

FIG. 1 shows a kick-scooter 1 in a usage position, comprising:
- a platform 2 which has an elongate shape and on which a user (not shown) may put a foot, the other foot being put to the ground for exerting a lifting force (arrow F) frontwards;
- a tubular steering rod 3, which is arranged orthogonally to the platform 2 (in a usage position of FIG. 1) and is pivotable about a first axis A, which is the longitudinal axis of the rod; the rod being connected, on its lower end, to a fork 4 (particularly visible in FIGS. 9 to 11), which is provided with two parallel arms 4A and 4B at extreme distal ends, a front wheel 5 of which is mounted in such a way that it is during a usage rotatable about an axis that is parallel to the ground; the fork 4 comprising, in its upper portion, a cylindrical pin 6 (FIG. 9); the upper (distal) end of the steering rod 3 being provided with a transversal handlebar 3A; the front wheel pivoting substantially coaxially with the steering rod about the first rotational axis;
- a bracket 7 comprising two parallel arms 7A and 7B and spanning across said fork 4.

The platform 2 is mounted, in an articulated fashion, on the distal ends of each arm 7A and 7B of the bracket 7 along a second rotational axis 8 (in parallel to the ground during usage). These ends are situated inside the region which is delimited by the surface of the front wheel 5.

To put it more precisely, the front end of the platform 2, i.e. in a proximity of the steering rod 3, is provided with two planar elongate legs 9A, 9B, namely a left leg 9A and a right leg 9B, which are parallel to each other. During utilization of the kick-scooter, the legs are each arranged in a plane that is perpendicular to the ground, and they feature a slight upward inclination with respect to the plane of the platform 2.

In this way the platform 2 is mounted in such a way that it is rotatable about the second rotational axis 8 between a first extreme position designated as a usage position, in which it is substantially perpendicular to the steering rod 3 and parallel to the ground (FIGS. 1, 5 and 9), and a second position designated as a folded-up position, in which it is folded up close to the steering rod and is substantially parallel to the latter (FIGS. 4 and 7).

The dimensions of the folded-up kick-scooter are reduced due to the fact that the second rotational axis 8 is situated inside a region that is delimited by the surface of the front wheel 5.

On the rear end of the platform 2, which is situated opposite the steering rod 3, a rear wheel 10 is mounted in a freely rotatable fashion, with a diameter that is equivalent to or smaller than a diameter of the front wheel 5. A comparably flexible flange 22 covers the rear wheel 10 in an immediate proximity of the rear wheel 10 and serves as a brake when a pressure is applied thereupon by the foot.

The steering rod 3 is mounted in such a way that, during utilization of the kick-scooter, it is rotatable about its longitudinal axis A, which is approximately vertical or very slightly inclined with respect to the ground (FIGS. 1 and 5).

In particular, the top of the bracket 7 is provided with a cylindrical sleeve 12, which is suitable for receiving the pin 6 (FIG. 9) of the fork 4. The pin 6 goes beyond the hollow sleeve 12 to allow the steering rod 3 fitting itself upon said pin. A clamping collar 13 thus allows the steering rod 3 clamping with the pin 6, and hence with the fork 4, wherein the rod is connected to the wheel by this maneuver substantially coaxially.

Clearly the arrangement implemented by the steering rod 3 and the fork 4 is rotationally movable about the subvertical axis A with respect to the arrangement implemented by the platform 2 and the bracket 7 (and the hollow sleeve 12).

To put it more precisely, the fork 4 pivots inside the bracket 7, wherein the pin 6 is rotationally guided in the hollow sleeve 12.

FIGS. 10 and 11 show the respective positions of the front wheel 5 and the corresponding fork 4 turned to the right (arrow "d") and to the left (arrow "g") around the first rotational axis A of the rod, due to a user's action onto the handlebar 3*a* (which is not shown in the partial views of FIGS. 10 and 11).

Regarding FIGS. 1 and 5, the steering rod 3 is implemented by two telescopic tubes, namely a lower tube 14, which is embodied in a torque-proof connection with the pin 6 and thus with the fork 4, and an upper tube 15, the outer diameter of which substantially corresponds to the inner diameter of the lower tube 14, as it is slightly smaller. In this way, the upper tube 15 glides in the lower tube 14. There is an adjustable positioning member of the mobile tube 15 provided in the lower tube 14, which will be described at a later stage.

Moreover, a compression mechanism is provided, which is connected to the bracket 7 and has an elongate shape, e.g. a compression spring 16, of which:

the first end is connected to the platform 2 via a pivot 18, which is situated at a distance unequal to zero from the second rotation axis 8; and the second end is fixated on a pivot 17, which is configured on the arm 7A of the bracket.

Also in particular, the first end of the spring 16 is fixated via a pivot 18 at the distal end of a rigid tongue 19, the proximal end of which is connected to the rotational axis 8 in a torque-proof fashion and is connected to the leg 9B via a force-fit implementation. The tongue 19 is hence equivalent to a protrusion that is connected to the platform 2 and includes an angle of approximately 120 degrees with the platform 2. The protrusion is moldable with the arm 9B.

The spring 16, which is supported on the pivot 17, and is connected to the bracket 7 in a force-fit implementation, the bracket 7 itself being connected to the steering rod 3, exerts a lifting force onto the platform 2 by means of the pivot 18 situated on the tongue 19, wherein the tongue 19 serves as a lever.

As has been described, the fixation points 17 and 18 of the spring 16 are situated inside a region that is delimited by the surface of the front wheel 5.

The role and the functionality of the spring 16 will be explained later on.

In a position of the platform 2 in which it is folded-up against the steering rod (as shown in FIG. 7), a clamping device 20 is provided, (possibly immovably) in a force-fit implementation with the steering rod 3, by a collar 21 which is substantially U-shaped. The device 20 cooperates, e.g. via clipsing, with the rear wheel 10 or with the flange 22 covering the rear wheel 10 and serving as a brake, by contact pressure due to the force which is exerted by the compression mechanism.

The clamping device 20 is configured on the one hand for damping the shock onto the steering rod 3, which is caused by the upward movement of the platform 2, and on the other hand for preventing the platform 2 from rotating about the first axis A of the steering rod 3.

As shown in FIGS. 2 and 6, projections 11A and 11B are respectively configured on the bracket 7A and 7B, which are intended to respectively abut on the arms 9B and 9A, in this way stopping the pivoting between the platform 2 and the rod 3 in a first direction.

Regarding FIGS. 5, 6 and 7, the kick-scooter comprises, opposite to the plane containing the spring 16, a lever designated L23, which is articulated with its fulcrum on a pivot 24 that is fixated on the bracket 7 (on the arm 7B of the bracket).

The lever 23 comprises a lower arm 25 and an upper arm 26 (which are arranged approximately perpendicularly), wherein the inner part of the angle faces towards the platform 2 in its unfolded position. The lever 23 is configured to cooperate with the force-fit leg 9A of the platform 2 for the purpose of locking or unlocking the pivoting between the platform 2 and the rod 3 in a second direction.

The lever is rotationally movable about the pivot 24 between:

a first position (FIG. 6, for which the platform 2 is unfolded), in which its arm 25 bears, with its outer distal edge 25A, against the outer distal edge 9A1 of the leg 9A; as a result of this, the rotation of the leg 9A and thus of the platform (about the axis 8) is prevented; the platform being locked in a usage position of rolling;

a second position (FIG. 7, for which the platform 2 is folded up), in which the lever 23 is rotated about the pivot 24 in a first rotation direction for the purpose of disengaging the arm 25 of the leg 9A, thus permitting the rotation of the platform 2 about the axis 8 and hence its folding-up against the rod 3.

As shown in FIG. 6, the distal end of the upper arm 26 of the lever 23 comprises a block 27 for allowing a user to support himself/herself thereon, for example, with a front portion of his/her foot, for the purpose of making the lever 23 pivot for disengaging it from the edge 9A1 of the leg 9A.

As shown in FIG. 6, an abutment 28 is provided on the bracket 7, which is configured for preventing the lever 23 from continuing its rotation, for the purpose of holding the lever 23 (as shown in FIG. 6, in which the lever blocks the rotation of the arm 9A or the rotation of the rod 3).

As can be seen in FIG. 8, the kick-scooter comprises a member which allows locking and unlocking of the relative translational movement of the upper inner tube 15 in the lower tube 14 of the steering rod 3.

This member comprises a sinkable nipple 29 on the upper tube 15, which is capable of partially traversing aligned, spaced-apart holes 30 which are configured on the lower tube 14.

FIG. 8 shows, in a section along a vertical plane, the upper portion of the rod, where a shank 31 is provided at an interior of the upper tube 15. The upper end of the shank 31 traverses the handlebar 3A and is equipped with a push button 32. A spring 33 is arranged coaxially with the shank 31 and inside the handlebar 3A.

The lower end of the shank 31 comprises a corner 34, which abuts on a leaf spring 35, which is connected to the nipple 29.

Starting from the position shown in FIG. 8, when the user (finger 36) presses the push button 32 downwards, the corner 34 pushes onto the spring 35 transversally and moves the nipple 29 translationally towards the inside of the upper tube 15, such that the nipple 29 no longer traverses the hole 30 that corresponds to the lower tube 14. Thus the depiction shown in a dashed line in FIG. 8 is achieved. The upper tube 15 may then glide in the lower tube 14.

In the following, the functionality of the compression mechanism of the compression spring 16 is described, as illustrated in FIGS. 3 and 4, when the steering rod 3 passes from its usage position for rolling on the ground (FIGS. 1 and 5) to its folded-up position against the platform (FIGS. 4 and 7) for a transport of the kick-scooter.

Starting from the usage position (rolling on the ground) of FIG. 3 up to the folded-up position (FIG. 4), the pivoting (arrow C2) of the platform 2 towards the rod 3 (or vice versa following the arrow C1 for unfolding), induces a clockwise pivoting of the tongue 19 around the second rotational axis 8 (from FIG. 3 to FIG. 4 in the exemplary embodiment shown).

At the start (FIG. 3), the lower pivot 18 (of the second end of the spring 16), which is situated on the distal end of the tongue 19, is located in such a way that it contacts the upper pivot 17 (of the first end of the spring 16) on the second rotational axis 8.

In the rotation of the platform 2 (in which the rod rotates about the second axis 8), the lower pivot 18 passes from the other side of said right-hand (contacting the upper pivot 17 on the second rotational axis 8 (FIG. 4).

In all positions, intermediate or extreme positions, of the platform 2 with respect to the rod 3 (or vice versa), the spring 16 exerts a force (F1 in FIG. 3 and F2 in FIG. 4) which generates a momentum applied onto the platform 2 via the tongue 19, the platform 2 being thus held in one of its extreme positions (usage of folded-up). The spring 16, which is preferably helicoidal, is in a compressed rest state in the usage position of the platform 2, and is in a tensioned state in a folded-up position of the platform 2.

Starting from the usage position, the user supports himself/herself on the block 27 of the lever 23, which provokes the rotation of the latter, thus releasing the arm 9A, which was blocked (FIG. 6). A slight inclination of the rod 3 effected by the user induces the change in direction of the momentum of C1 towards C2, and the spring force (FIG. 3) assists in a reciprocal rotation of the rod 3 with respect to the platform 2, and the rod 3 folds then up against the latter (or vice versa).

The compression force of the spring 16 is chosen to compensate (at least to a large extent) the weight of the platform 2, for the platform 2 lifting automatically, due to the impact of the momentum, for the purpose of folding up against the steering rod 3.

The invention claimed is:

1. A wheeled kick-scooter vehicle, comprising:
a platform of elongate shape, which is at its rear end provided with a wheel, and which a user may rest at least one foot upon; and
a steering rod capable of pivoting about a first axis, which is transversal with respect to the forward-motion direction of the vehicle, wherein the rod comprises a first distal end which is provided with a steering device and comprises a second proximal end which is connected to a front wheel via the intermediary of at least one fork straddling the front wheel,
wherein the platform is mounted in such a way that it pivots with respect to a second axis that is transversal to the first axis, the platform being thus movable between two extreme positions, namely an active rolling position, in which it is substantially perpendicular to the rod, and a folded-up position in parallel to the rod and close to the latter;
wherein the vehicle further comprises a compression mechanism which has an elongate shape and a first end of which is connected to said platform at a distance unequal to zero from the second axis, and a second end of which is connected to said rod for the purpose of exerting a lifting force onto the platform, inducing a torque about the second pivot axis of the platform;
wherein the platform of the collapsible wheeled kick-scooter vehicle is connected to the rod via a bracket which is shaped like an inverted U and spans the fork while permitting the rotation of the latter, wherein the U-shaped bracket features two spaced-apart parallel arms and the second pivot axis is arranged at the free ends of the parallel arms of the bracket; and
wherein the vehicle comprises locking members, which are actuable by a foot or by any other means, for locking a rotation of the platform about the second axis in a second direction, wherein the locking members advantageously comprise a lever which is articulated on the bracket between a first blockage position, in which it prevents the reciprocal rotation of the platform about the second rotational axis with respect to the rod, and a second position, in which it permits the rotation of the platform.

2. The vehicle according to claim 1, wherein the compression mechanism is fixated on the bracket via its second end.

3. The vehicle according to claim 1, wherein the compression mechanism is fixated on the platform via its first end in such a way that it exerts a lifting force on the latter in its two extreme positions.

4. The vehicle according to claim 1, wherein the fixation points of the compression mechanism are arranged around the second rotational axis in such a way that they induce, in a rotation of the steering rod, when passing a given angle position, an inversion of the direction of the torque exerted by the mechanism.

5. The vehicle according to claim 1, wherein the second rotational axis is situated in the region that is delimited by the surface of the front wheel.

6. The vehicle according to claim 1, wherein an abutment is provided which is connected to the bracket and prevents, in one direction, the rotation of the bracket, and hence of the rod, about the second rotational axis.

7. The vehicle according to claim 1, wherein the platform is connected to the second rotational axis via two opposing parallel legs arranged on both sides of the front wheel and of the arms of the bracket, and featuring a force-fit connection in pivoting about the second axis, wherein the locking members, which are fixated on the bracket, cooperate with at least one of the legs by contacting in the blockage position which corresponds to the usage position.

8. The vehicle according to claim 1, wherein the drive front wheel pivots about the first rotational axis substantially coaxially with the steering rod.

9. The vehicle according to claim 1, wherein the steering rod comprises two coaxial tubes, the one gliding in the other one, as well as a cam which is actuatable by a push button and controls a sinking of a pin between the coaxial tubes, which unlocks the two coaxial tubes.

10. A wheeled kick-scooter vehicle, comprising
- a platform of elongate shape, which is at its rear end provided with a wheel, and which a user may rest at least one foot upon; and
- a steering rod capable of pivoting about a first axis, which is transversal with respect to the forward-motion direction of the vehicle, wherein the rod comprises a first distal end which is provided with a steering device and comprises a second proximal end which is connected to a front wheel via the intermediary of at least one fork straddling the front wheel,
- wherein the platform is mounted in such a way that it pivots with respect to a second axis that is transversal to the first axis, the platform being thus movable between two extreme positions, namely an active rolling position, in which it is substantially perpendicular to the rod, and a folded-up position in parallel to the rod and close to the latter;
- wherein the vehicle further comprises a compression mechanism, which has an elongate shape and a first end of which is connected to said platform at a distance unequal to zero from the second axis, and a second end of which is connected to said rod for the purpose of exerting a lifting force onto the platform, inducing a torque about the second pivot axis of the platform;
- wherein the platform of the collapsible wheeled kick-scooter vehicle is connected to the rod via a bracket which is shaped like an inverted U and spans the fork while permitting the rotation of the latter, wherein the U-shaped bracket features two spaced-apart parallel arms and the second pivot axis is arranged at the free ends of the parallel arms of the bracket; and
- wherein the platform is connected to the second rotational axis via two opposing parallel legs arranged on both sides of the front wheel and of the arms of the bracket, and featuring a force-fit connection in pivoting about the second axis, wherein the locking members, which are fixated on the bracket, cooperate with at least one of the legs by contacting in the blockage position which corresponds to the usage position.

* * * * *